United States Patent
Scothern

(10) Patent No.: US 8,297,039 B2
(45) Date of Patent: Oct. 30, 2012

(54) PROPULSION ENGINE

(75) Inventor: David P. Scothern, Derby (GB)

(73) Assignee: Rolls-Royce plc, London (GB)

( * ) Notice: Subject to any disclaimer, the term of this patent is extended or adjusted under 35 U.S.C. 154(b) by 0 days.

(21) Appl. No.: 12/882,539

(22) Filed: Sep. 15, 2010

(65) Prior Publication Data

US 2011/0083416 A1    Apr. 14, 2011

(30) Foreign Application Priority Data

Oct. 12, 2009  (GB) .................................. 0917726.2

(51) Int. Cl.
F02K 3/00 (2006.01)

(52) U.S. Cl. .......................................... 60/224; 60/772

(58) Field of Classification Search .................. 60/224, 60/225, 226.1, 244, 785, 805, 802, 772; 415/121.1, 415/121.2
See application file for complete search history.

(56) References Cited

U.S. PATENT DOCUMENTS

| | | | | |
|---|---|---|---|---|
| 2,404,767 A * | 7/1946 | Heppner | ........................... | 60/262 |
| 2,583,872 A * | 1/1952 | Newcomb | ...................... | 475/332 |
| 2,826,255 A * | 3/1958 | Peterson | .......................... | 416/32 |
| 4,159,624 A * | 7/1979 | Gruner | ........................ | 60/39.183 |
| 4,446,696 A * | 5/1984 | Sargisson et al. | ............. | 60/226.3 |
| 4,514,976 A * | 5/1985 | Christoff | .......................... | 60/785 |
| 4,642,029 A * | 2/1987 | Cedoz | ............................ | 416/129 |
| 4,915,586 A * | 4/1990 | Williams | ........................ | 416/89 |
| 4,927,329 A * | 5/1990 | Kliman et al. | ................ | 416/127 |
| 4,936,748 A * | 6/1990 | Adamson et al. | ............. | 416/123 |
| 4,964,315 A * | 10/1990 | Willis, Jr. | ................. | 74/665 GA |
| 5,079,916 A * | 1/1992 | Johnson | ........................... | 60/268 |
| 6,895,741 B2 * | 5/2005 | Rago et al. | ..................... | 60/226.1 |
| 7,363,757 B2 * | 4/2008 | Loisy | ............................ | 60/226.1 |
| 7,384,239 B2 * | 6/2008 | Wacinski | ....................... | 416/128 |
| 7,481,062 B2 * | 1/2009 | Gaines et al. | .................... | 60/792 |
| 7,552,582 B2 * | 6/2009 | Eick et al. | .................. | 60/39.163 |
| 7,752,834 B2 * | 7/2010 | Addis | .............................. | 60/224 |
| 7,802,757 B2 * | 9/2010 | Dooley et al. | .................... | 244/60 |
| 7,966,833 B2 * | 6/2011 | Beutin et al. | ..................... | 60/802 |
| 2006/0096272 A1 * | 5/2006 | Baughman et al. | ............. | 60/232 |
| 2008/0253881 A1 * | 10/2008 | Richards | ....................... | 415/145 |
| 2009/0263247 A1 * | 10/2009 | Mollmann | ..................... | 416/144 |
| 2009/0293494 A1 * | 12/2009 | Hoffjann et al. | ................ | 60/780 |
| 2009/0320491 A1 * | 12/2009 | Copeland | ......................... | 60/772 |
| 2010/0219779 A1 * | 9/2010 | Bradbrook | ..................... | 318/153 |

FOREIGN PATENT DOCUMENTS

| | | |
|---|---|---|
| EP | 1 933 017 A2 | 6/2008 |
| EP | 1 936 238 A2 | 6/2008 |
| WO | WO 2008/082336 A1 | 7/2008 |

OTHER PUBLICATIONS

British Search Report issued in British Patent Application No. 0917726.2 dated Feb. 9, 2010.

* cited by examiner

*Primary Examiner* — Phutthiwat Wongwian
(74) *Attorney, Agent, or Firm* — Oliff & Berridge, PLC

(57) ABSTRACT

A propulsion engine (100) for an aircraft, the propulsion engine comprising: one or more fans (110, 120); driving means (132) arranged to drive the one or more fans; and power transfer means (134) connected to the one or more fans and arranged to selectively transfer a variable amount of power to or from the one or more fans so as to control the rotational speed of the one or more fans.

15 Claims, 3 Drawing Sheets

PROPULSION ENGINE

This invention relates to a propulsion engine and particularly but not exclusively relates to a propulsion engine for an aircraft.

A propfan engine is a modified turbofan engine and typically comprises an unducted fan arranged on the same axis as the compressor and/or turbine of a turbofan engine.

In one example of a propfan engine, thrust is produced by a pair of contra-rotating unducted fans, which are driven by a free power turbine via a differential epicyclic gearbox. As such, the speeds of the two unducted fans are free to vary relative to one another. However, to minimise noise and maximise efficiency, the ratio of the rotational speeds of the unducted fans should be well-controlled.

The rotational speeds of the unducted fans may be controlled by varying the pitch of the blades on one or both of the unducted fans, thereby adjusting the aerodynamic torque exerted on each unducted fan and hence their relative speeds. However, complex and heavy systems are required to actuate the variable pitch mechanisms.

In addition to the above, a conventional propfan engine's windmill relight ability is poor because most of the propfan engine's thrust is developed via the free power turbine. The free power turbine is not connected to the rest of the engine and as a result the unducted fans do not assist in restarting the compressor in the event that the engine stalls.

The present invention therefore seeks to address these issues.

According to a first aspect of the present invention there is provided a propulsion engine for an aircraft, the propulsion engine comprising: one or more fans; driving means arranged to drive the one or more fans; and power transfer means connected to the one or more fans and arranged to selectively transfer a variable amount of power to or from the one or more fans so as to control the rotational speed of the one or more fans.

According to a second aspect of the present invention there is provided a speed controlling assembly for a propulsion engine, the propulsion engine comprising one or more fans, wherein the speed controlling assembly comprises power transfer means connectable to the one or more fans and arrangeable to selectively transfer a variable amount of power to or from the one or more fans so as to control the rotational speed of the one or more fans.

The propulsion engine may comprise first and second fans with the power transfer means connected to the first fan so as to control the rotational speed of the first fan with respect to the rotational speed of the second fan. The propulsion engine may further comprise a clutch arranged between the power transfer means and the one or more fans. The propulsion engine may comprise first and second fans driven by a free power turbine via a differential assembly. The one or more fans may be unducted fans.

The power transfer means may be arranged to transfer power from the one or more fans to one or more propulsion engine accessories. The power transfer means may be arranged to transfer power from the one or more fans to a core of the propulsion engine. The power transfer means may comprise a variable torque transmission.

The propulsion engine may further comprise one or more electrical transducers connected to the one or more fans. The propulsion engine may comprise one or more propulsion engine accessories connected to the one or more fans with power passing from the one or more fans to the one or more propulsion engine accessories.

The power transfer means may comprise a first transducer. The first transducer may convert the mechanical power of the one or more fans into electrical power. The propulsion engine may comprise a second transducer, which may be arranged so as to convert mechanical power from a core of the propulsion engine into electrical power. The first and second transducers may provide electrical power to a common electrical network.

According to a third aspect of the present invention there is provided a method of controlling a propulsion engine for an aircraft, the propulsion engine comprising one or more fans, wherein the method comprises: driving the one or more fans by virtue of a driving means; selectively transferring a variable amount of power to or from the one or more fans by virtue of a power transfer means; and controlling the rotational speed of the one or more fans.

According to a fourth aspect of the present invention there is provided a propulsion system for a vehicle, the propulsion system comprising driving means and first and second propulsion elements driven by the driving means, wherein the propulsion system comprises a variable torque transmission connectable to the first propulsion element so as to selectively transfer a variable amount of power to or from the first propulsion element and thereby control the speed of the first propulsion element with respect to the speed of the second propulsion element.

For a better understanding of the present invention, and to show more clearly how it may be carried into effect, reference will now be made, by way of example, to the accompanying drawings, in which:-

Figure 1:
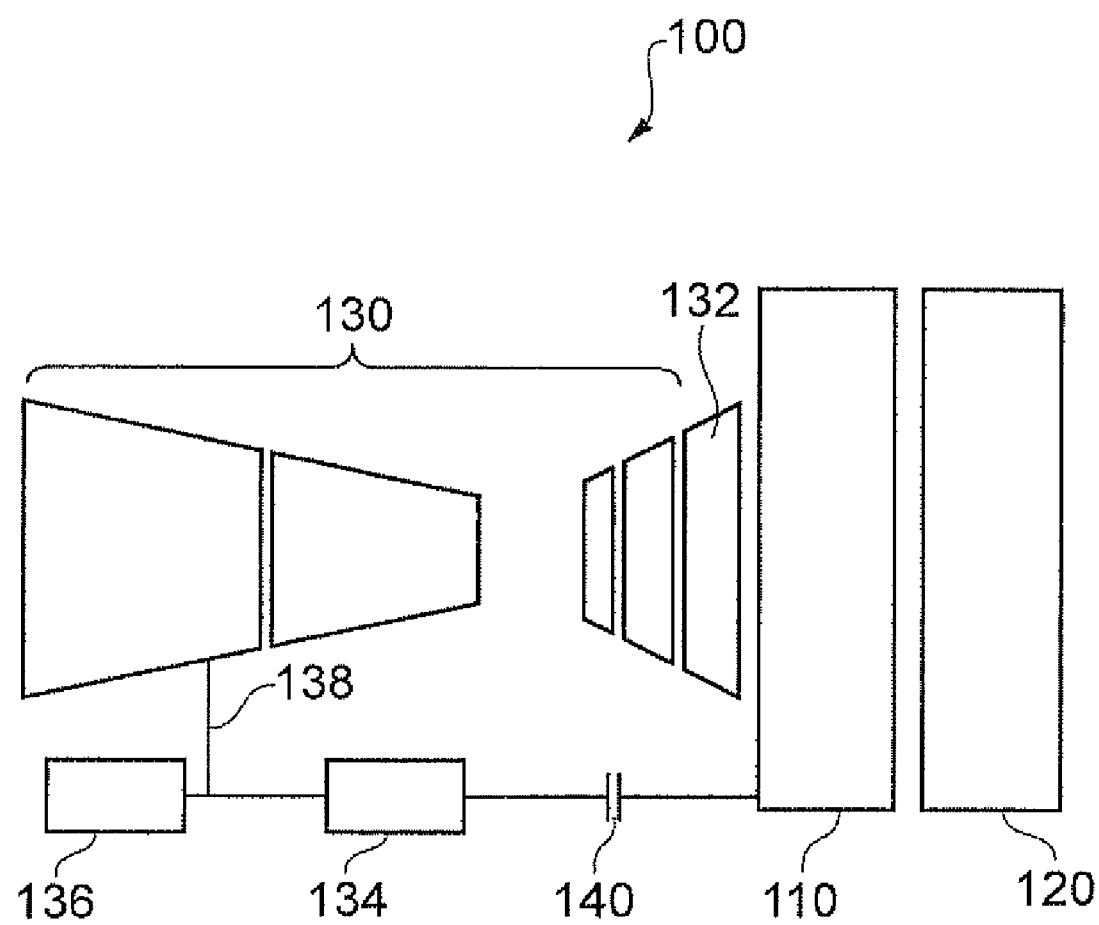
FIG. 1 shows a schematic diagram of a speed controlling assembly according to a first embodiment of the present invention.

With reference to FIG. 1, a propulsion engine 100, according to a first embodiment of the present invention, comprises contra-rotating rotors, which may for example be first and second fans 110, 120. The first and second fans 110, 120 may be unducted fans and as such the propulsion engine 100 may be an example of a propfan engine for an aircraft. In the example shown in FIG. 1, the first and second unducted fans are located aft of a core 130 of the propulsion engine 100, but may alternatively be placed fore of the engine core 130. The first and second unducted fans 110, 120 are driven by a free power turbine 132 via an epicyclic differential (not shown). The free power turbine 132 is in the gas stream from the engine core 130.

The propulsion engine 100 comprises power transfer means 134 which is operatively connected to the first unducted fan 110. Although the first unducted fan 110 is shown as being located fore of the second unducted fan 120, in an alternative embodiment (not shown), the first unducted fan may be aft of the second unducted fan.

In the embodiment shown in FIG. 1, the power transfer means 134 is mechanically connected to the first unducted fan 110 for example by virtue of a shaft assembly (not shown) connected to a shaft of the first unducted fan. In other words, the power transfer means comprises a power take off assembly driven from the first unducted fans (which may be fore or aft of the second unducted fan).

The power transfer means 134 is arranged to selectively transfer a variable amount of power to or from the first unducted fan 110 so as to control the rotational speed of the first unducted fan 110 with respect to the rotational speed of the second unducted fan 120. For example, increasing the power removed from the first unducted fan 110 reduces the rotational speed of the first unducted fan. Similarly, reducing the power removed from the first unducted fan 110 (or increasing the power transferred to the first unducted fan) increases the rotational speed of the first unducted fan (power may be transferred from the power transfer means to the first unducted fan). The rotational speed of the first unducted fan may therefore be controlled in this manner. The rotational speeds of the first and second unducted fans may be more closely controlled in order to increase the efficiency and reduce the noise of the propulsion engine.

The power transfer means 134 comprises a variable torque transmission, which may consist of a conventional gearbox arrangement or a continuously variable transmission, for example an epicyclic gear assembly. As such the power transfer means 134 is able to vary the torque seen by, or transferred to, the first unducted fan 110. The power transferred from, or to, the first unducted fan is therefore also varied by adjusting the torque of the variable torque transmission. For example, the torque exerted by the power transfer means 134 may be actively controlled by varying the speed ratio of the variable torque transmission.

Power extracted from the first unducted fan 110 may be passed through the power transfer means 134 to an accessory gearbox 136 and thence to one or more engine accessories, for example a fuel pump, oil pump or generator. The accessory gearbox 136 may also be driven by the engine core 130 via a transmission 138. The transmission 138 may also connect the engine core 130 to the power transfer means 134. The propulsion engine 100 may further comprise a clutch 140 arranged between the first unducted fan and the power transfer means 134 so as to selectively connect the power transfer means 134 to the first unducted fan 110. The clutch 140 allows the engine core 130 to be disconnected from the first unducted fan 110 in order to permit starting of the propulsion engine 100.

The power transfer means 134 extracts a variable amount of power from the first unducted fan 110, thereby allowing fine control of the fan speed. The optimum speed ratio between the first and second unducted fans, both for efficiency and for noise control may therefore be maintained. The speed of the first and second fans may also be controlled by varying the geometry of the aerofoil structures (e.g. fan blades). For example, the propulsion engine 100 may further comprise a variable pitch mechanism which is arranged to reconfigure the geometry of the fan blades (e.g. coarse pitch, fine pitch, feather or reverse thrust). However, with the present invention closed-loop fine control of the rotational speed of the first unducted fan may be achieved without reconfiguring the fan blades. The "fine-tuning" mechanism of the present invention reduces the need for accuracy of blade positioning between the two unducted fans, although tight control of blade-to-blade pitch variation within individual fans is still advantageous.

In steady state operation, the engine core 130 and unducted fans 110, 120 run at a constant speed. Furthermore, a constant torque exerted by the variable-torque transmission means that the power transferred from the first unducted fan 110 to the engine core 130 is constant. In the case of the propulsion engine being used for an aircraft, the amount of power drawn from the first unducted fan 110 will vary at different points in the flight cycle. For example, during descent, engine speed could be kept high and accessory demand satisfied at very low fuel flow rates if a lot of power was taken from the first unducted fan 110, by capturing gravitational potential energy as the aircraft descends. A further benefit is that the descent angle of the aircraft will increase at this lower thrust level, thereby reducing the environmental impact of aircraft noise around airports.

If the first unducted fan 110 begins to run faster than desired, the power transfer means 134 may exert a higher braking torque on the first unducted fan, thereby transferring more power to the engine core 130. As a result, the first unducted fan 110 will slow down to the required speed. Conversely, if the first unducted fan 110 runs more slowly than intended, a reduction in the power taken from the first unducted fan 110 allows the first unducted fan to return to its target speed.

Furthermore, in the event that the propulsion engine stalls, power may be extracted from the first unducted fan 110, by virtue of a windmill effect, and used to relight the engine core 130. The power extracted from the first unducted fan 110 may augment the starter generators to allow rapid relighting of the engine core 130 at a time when electrical power for the starters is in short supply.

In general terms, the present invention allows for enhanced control of the relative rotational speeds of first and second driven elements driven by a differential, for example an epicyclic differential. This is achieved by applying a variable torque to one output of the differential and the variable torque may be provided by a variable torque device. Any power extracted from the output of the differential may be transferred to one or more accessories.

Further, the present invention may permit a reduction in the weight of the overall propulsion engine 100. With the present invention, the propulsion engine's generators (not shown) may be driven by the first unducted fan 110, which has a very narrow speed range as opposed to the wide speed range of the engine core 130. Consequently, the output frequency range of the propulsion engine's generators is similarly narrow, thereby permitting a reduction in the weight of any power electronics.

During low-power phases of flight, the present invention may be configured to return power from the first and second unducted fans 110, 120 to the engine core 130. This allows a reduced fuel flow and hence an improvement in specific fuel consumption. The reduced thrust will also permit an aircraft to descend more steeply, thereby reducing the noise footprint of the aircraft.

In an alternative embodiment not shown, the second unducted fan may also be provided with a power transfer means so that the rotational speeds of both the first and second unducted fans may be controlled.

Figure 2:
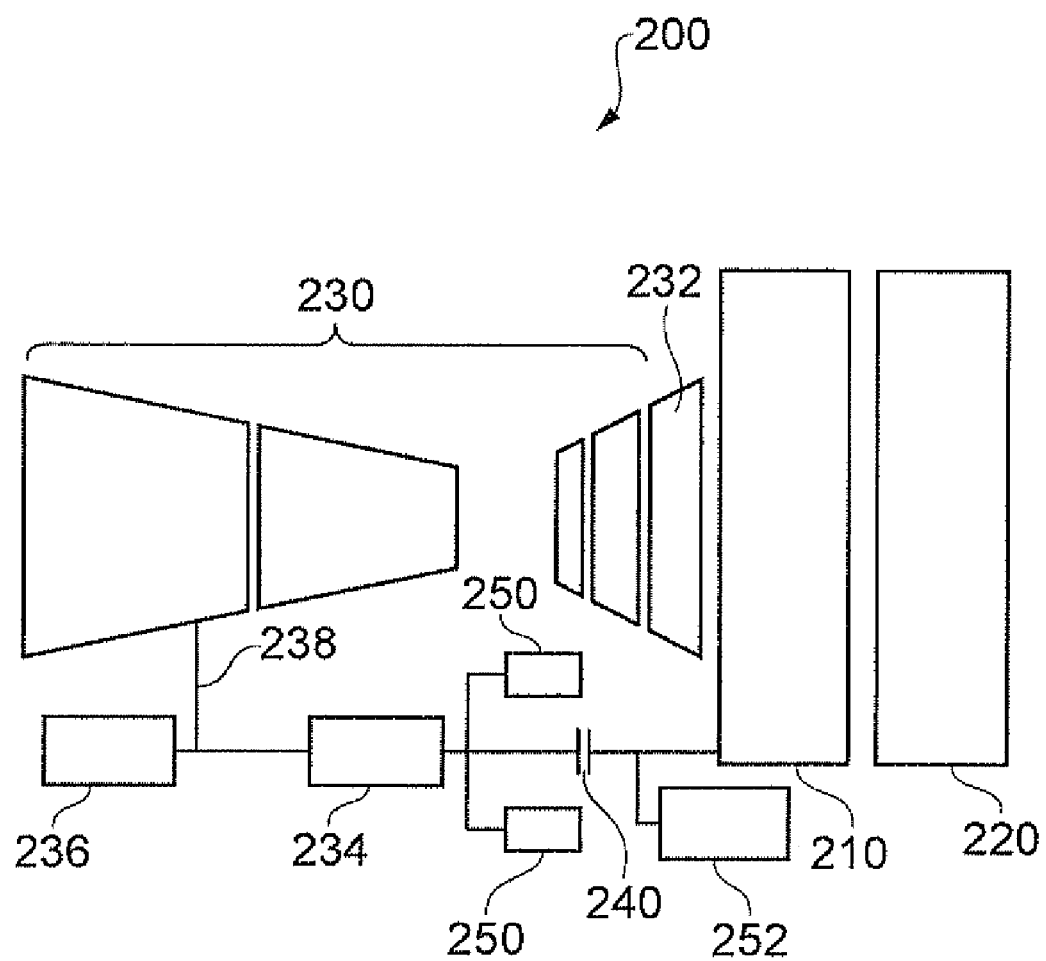
FIG. 2 shows a schematic diagram of a speed controlling assembly according to a second embodiment of the present invention.

With reference to FIG. 2, a propulsion engine 200, according to a second embodiment of the present invention is similar to the first embodiment in that the propulsion engine 200 comprises contra-rotating rotors, which may for example be first and second fans 210, 220 located aft of an engine core 230. The first and second fans 210, 220 may be unducted and may be driven by a free power turbine 232 via an epicyclic differential (not shown). The free power turbine 232 is in the gas stream from the engine core 230.

As for the first embodiment, the propulsion engine 200 of the second embodiment comprises a power transfer means 234, which is operatively connected to the first unducted fan 210. The power transfer means 234 is mechanically connected to the first unducted fan 210 for example by virtue of a shaft assembly (not shown) connected to a shaft of the first unducted fan 210.

Power extracted from the first unducted fan 210 may be passed through the power transfer means 234 to an accessory gearbox 236 and thence to one or more engine accessories.

The accessory gearbox 236 may also be driven by the engine core 230 via a transmission 238. The transmission 238 may also connect the engine core 230 to the power transfer means 234. The propulsion engine 200 may further comprise a clutch 240 arranged between the first unducted fan 210 and the power transfer means 234 so as to selectively connect the power transfer means 234 to the first unducted fan 210. The first unducted fan 210 of the propulsion engine 200 may also be optionally connected to one or more accessories 252 such that power may be transmitted from the first unducted fan to the one or more accessories 252.

As shown in FIG. 2, energy transducers, for example one or more electrical generators 250 may be mounted between the power transfer means 234 and the first unducted fan 210. With such an arrangement, the electrical generators 250 operate over the speed range of the first fan 210, which is typically narrower than the speed range of the engine core 230. As a result, the frequency range of the electrical generators 250 output is narrow, allowing smaller generators and airframe electronics.

Furthermore, with the arrangement shown in FIG. 2 power may be transferred through the power transfer means 234 in two directions. For example, power may be transferred from the first unducted fan 210 to the engine core 230, or from the engine core 230 to the generators 250. This makes best use of the power transfer means 234, thereby minimising its size for a given duty.

Figure 3:
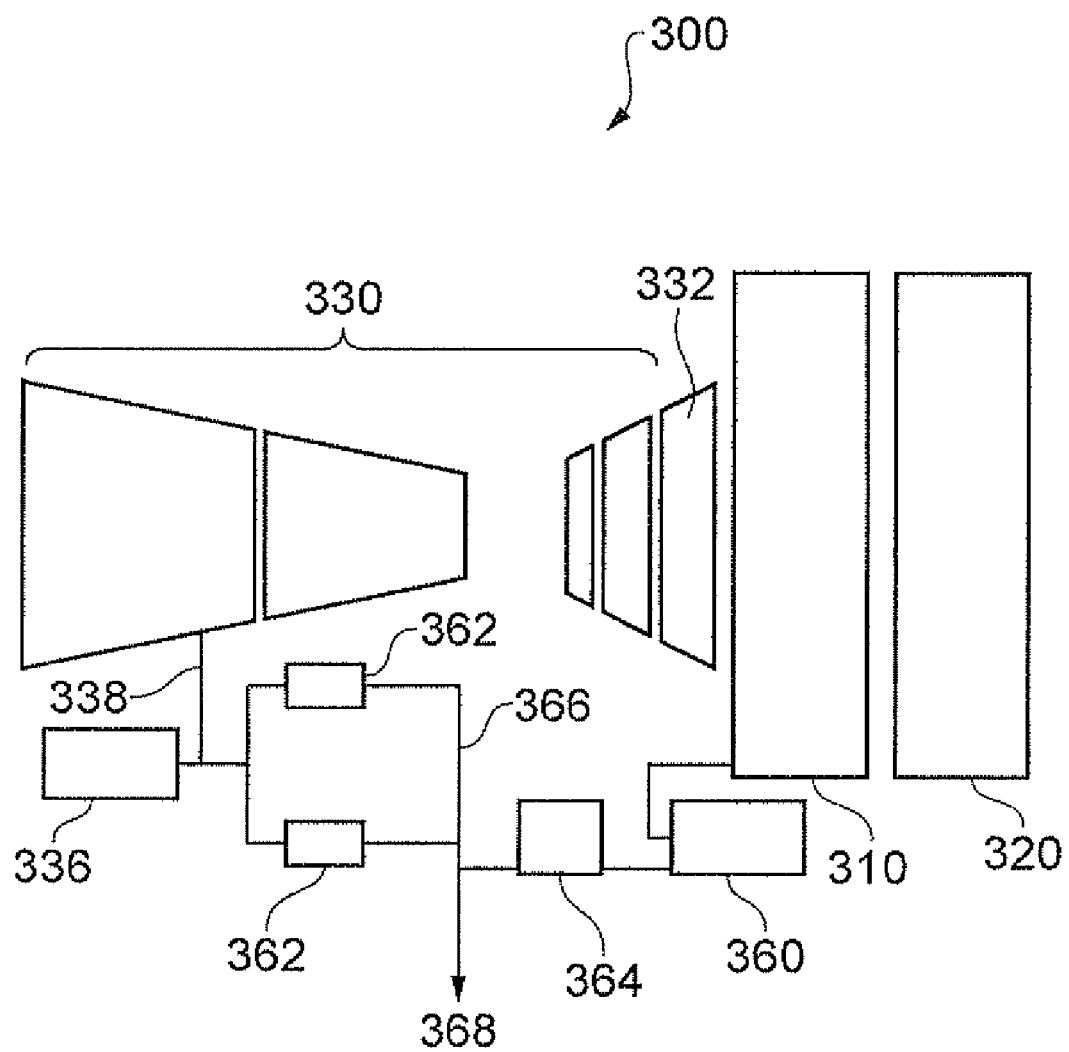
FIG. 3 shows a schematic diagram of a speed controlling assembly according to a third embodiment of the present invention.

With reference to FIG. 3, a propulsion engine 300, according to a third embodiment of the present invention, comprises contra-rotating rotors, which may for example be first and second fans 310, 320 located aft of an engine core 330. The first and second fans 310, 320 may be unducted and may be driven by a free power turbine 332 via an epicyclic differential (not shown). The free power turbine 332 is in the gas stream from the engine core 330.

The propulsion engine 300 according to the third embodiment further comprises a first transducer 360. The first transducer 360 may be in the form of an electrical generator and as such may convert the mechanical power of the first fan 310 into electrical power. The propulsion engine 300 may further comprises a second transducer 362 arranged so as to convert mechanical power from the engine core 330 into electrical power. An accessory gearbox 336 may also be driven by the engine core 330 via a transmission 338. The first and second transducers 360, 362 may provide electrical power to a common electrical network 366. Load sharing between first and second transducers 360, 362 would allow variation of the torque applied to the first fan 310 and thus permit control of the first fan's rotational speed. Accordingly, the present invention may be implemented electrically as well as mechanically. In an alternative embodiment (not shown), the present invention may also be implemented hydraulically.

The propulsion engine 300 according to the third embodiment may further comprise a power converter 364. The power converter 364 may convert the frequency of the output from the first and/or second transducers 360, 362 so that their frequencies match. The common electrical network 366 may also provide electrical power via an output 368.

The invention claimed is:

1. A propulsion engine for an aircraft, the propulsion engine comprising:
   first and second fans;
   a power turbine that drives the first and second fans; and
   power transfer means mechanically connected to a core of the propulsion engine and mechanically connected to the first fan by a shaft assembly and arranged to selectively transfer a variable amount of power to or from the first fan so as to maintain an optimum speed ratio between the first and second fans.

2. The propulsion engine according to claim 1, wherein the first and second fans are unducted fans.

3. The propulsion engine according to claim 1, wherein the power transfer means is arranged to transfer power from the first fan to one or more propulsion engine accessories.

4. The propulsion engine according to claim 1, wherein the power transfer means is arranged to transfer power from the first fan to the core of the propulsion engine.

5. The propulsion engine according to claim 1, wherein the power transfer means comprises a variable torque transmission.

6. The propulsion engine according to claim 1, wherein the propulsion engine further comprises a clutch arranged between the power transfer means and the first fan.

7. The propulsion engine according to claim 1, wherein the first and second fans are driven by the power turbine via a differential assembly.

8. The propulsion engine according to claim 1, wherein the propulsion engine further comprises one or more electrical transducers connected to the first fan.

9. The propulsion engine according to claim 1, wherein the propulsion engine comprises one or more propulsion engine accessories connected to the first fan with power passing from the first fan to the one or more propulsion engine accessories.

10. The propulsion engine according to claim 1, wherein the power transfer means comprises a first transducer.

11. The propulsion engine according to claim 10, wherein the first transducer converts the mechanical power of the first fan into electrical power.

12. The propulsion engine according to claim 11 wherein the propulsion engine comprises a second transducer arranged so as to convert mechanical power from the core of the propulsion engine into electrical power.

13. The propulsion engine according to claim 12, wherein the first and second transducers provide electrical power to a common electrical network.

14. A method of controlling a propulsion engine for an aircraft, the propulsion engine comprising first and second fans, wherein the method comprises:
   driving the first and second fans by virtue of a power turbine; and
   selectively transferring a variable amount of power to or from the first fan by virtue of a power transfer means connected to a core of the propulsion engine and mechanically connected to the first fan by a shaft assembly so as to maintain an optimum speed ratio between the first and second fans.

15. A speed controlling assembly for a propulsion engine, the propulsion engine comprising first and second fans driven by a power turbine,
   wherein the speed controlling assembly comprises power transfer means connected to a core of a propulsion engine and mechanically connected to the first fan by a shaft assembly and arrangeable to selectively transfer a variable amount of power to or from the first fan so as to maintain an optimum speed ratio between the first and second fans.

* * * * *